United States Patent [19]
Young

[11] Patent Number: 5,853,587
[45] Date of Patent: Dec. 29, 1998

[54] CORROSIVE RESISTANT DISK FILTER

[76] Inventor: Richard T. Young, 7141 Thomas St., uena Park, Calif. 90621

[21] Appl. No.: 767,588

[22] Filed: Dec. 14, 1996

[51] Int. Cl.⁶ .................................................... B01D 25/00
[52] U.S. Cl. ......................... 210/44 S; 210/446; 210/447; 210/451
[58] Field of Search ................................... 210/446, 447, 210/445, 451

[56] References Cited

U.S. PATENT DOCUMENTS

| D. 260,175 | 8/1981 | Hein et al. . |
| D. 306,340 | 2/1990 | Whiting . |
| 3,954,625 | 5/1976 | Michalski . |
| 4,148,732 | 4/1979 | Burrow et al. . |
| 4,159,954 | 7/1979 | Gangemi . |
| 4,229,306 | 10/1980 | Hein et al. . |
| 4,404,006 | 9/1983 | Williams et al. . |
| 4,414,172 | 11/1983 | Leason ..................................... 210/455 |
| 4,444,661 | 4/1984 | Jackson et al. . |
| 4,863,598 | 9/1989 | Drori . |
| 4,874,513 | 10/1989 | Chakraborty et al. . |
| 5,147,545 | 9/1992 | Despard et al. . |
| 5,250,179 | 10/1993 | Spearman ............................. 210/493.2 |
| 5,443,723 | 8/1995 | Stanowski et al. ..................... 210/455 |

*Primary Examiner*—David A. Reifsynder
*Attorney, Agent, or Firm*—James G. O'Neill

[57] ABSTRACT

A fluid filter has a housing fabricated from two portions made from a toxic resistant plastic, such as TEFLON, and includes a filter element sealingly supported therein in such a manner that contaminants or foreign material filtered thereby is captured in an area closed off by novel seals formed between the two housing portions. The seals may take the form of an accordion-type seal, or, male-female type engaging ends may be used. The seals allow the filter element to be removed and examined, if needed, and allows the housing portions to be easily and quickly assembled and disassembled for repair or examination.

12 Claims, 2 Drawing Sheets

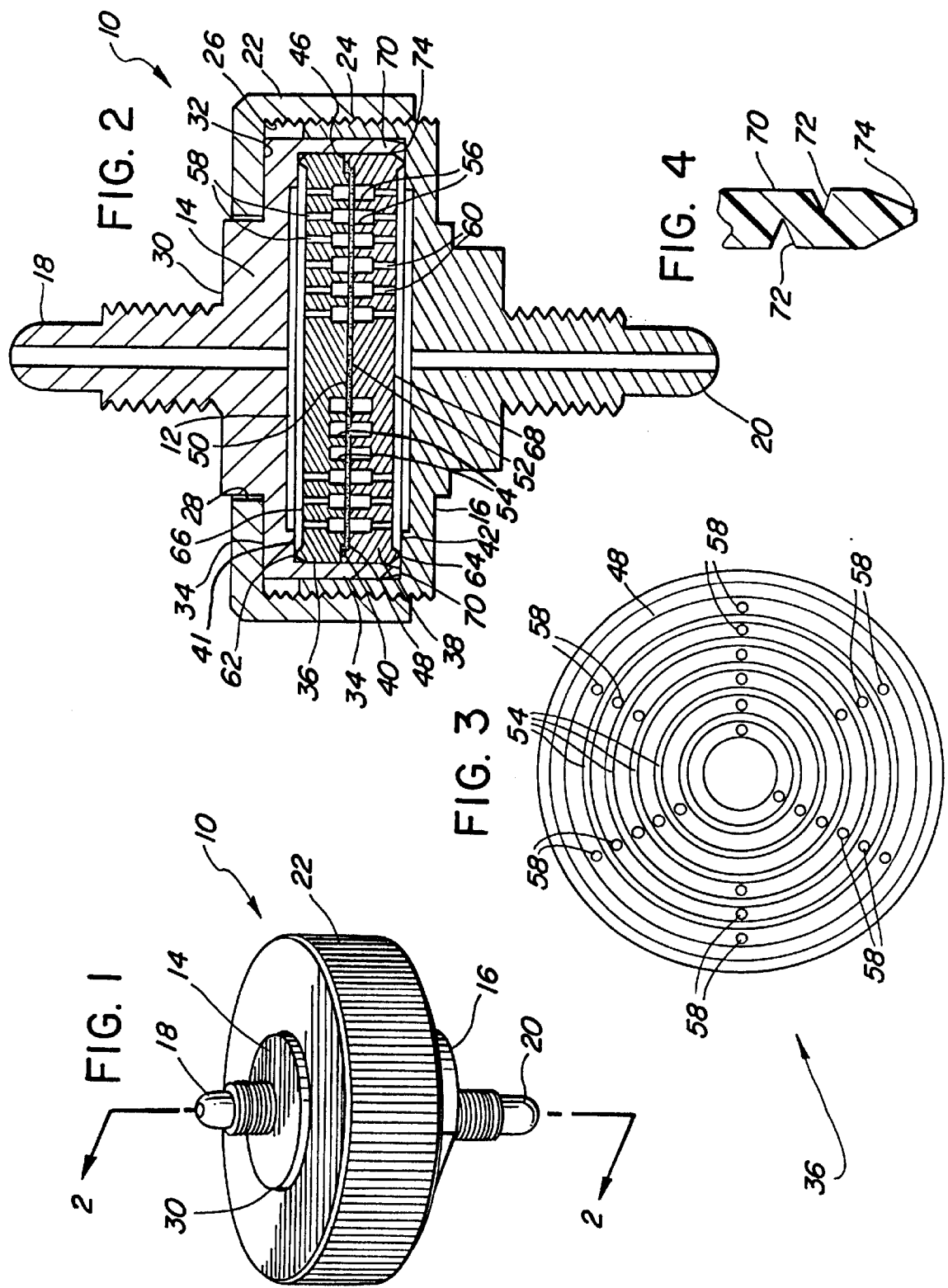

CORROSIVE RESISTANT DISK FILTER

BACKGROUND OF THE INVENTION

1. Field of the Invention

This invention relates generally to fluid filters and, more particularly, to a filter made from a corrosive resistant plastic for use in pressurized systems to filter foreign materials from fluids.

2. Description of Related Art

In many industries, such as the film processing and the electronic industries, which use caustic or corrosive fluids there exists the need for a filter which efficiently filters out contaminants or foreign materials suspended in such caustic or corrosive fluids used during a manufacturing or other process. Known filters do not work adequately in such an environment and in many instances are prone to leakage, particularly when subjected for long periods of time to the foreign materials present in the caustic or corrosive fluids being filtered. The known filters and there drawbacks are well known to those skilled in the art.

Many filters and methods of making the same are currently available for filtering various fluids. Most filters, however, are designed for specific applications, and cannot tolerate the caustic or corrosive fluids used in various industries, such as film developing, computer chip manufacturing, and other processes. Such known filters, therefore, if at all useable, are subject to early failure or complete breakdown.

Proper control of the caustic or corrosive fluids being filtered requires a filter made from specific materials as well as efficient sealing means. Currently, neither the materials nor the sealing means used in known filters work adequately and the filters must be constantly replaced, resulting in undesirable and expensive downtime.

Known filters and methods of forming the same are disclosed in U.S. Pat. No. 4,444,661 to Jackson et al. ("'661") and 4,874,513 to Chakraborty et al ("'513"). These patents disclose disposable filter devices made from plastic with two (2) central holding disks supporting a central filter element. In the '661 patent a resilient seal ring is positioned between the annular surface of one central holding disk and the periphery of the central filter element. While in the '513 patent both of the central holding disks are in the form of grates having concentrically arranged coplanar circular webs and a centrally arranged baffle plate with the central filter element held therebetween. In each of these patents, the 2 central holding disks are held in a chamber formed in cylindrical bodies having fluid inlets and outlets. The cylindrical bodies are composed of two (2) halves which telescope into each other to hold the 2 central holding disks and the central filter element in place. An exterior closing ring or annulus is provided in each patent to hold the 2 halves together.

U.S. Pat. No. 3,954,625 to Michalski, discloses a filter having a plastic housing with an intermediate filter screen. The peripheral portion of the screen is sealed between two housing halves by flowing a portion of at least one of the housing halves through the screen and bonding that portion to the other housing half.

U.S. Pat. No. 4,148,732 to Burrow et al., discloses a bacteria filter unit having a two piece frustroconical housing which are held together at one end by male and female interlocking flanges. A filter media is held between the interlocking flanges when the two piece housing is assembled.

Other known filter devices are shown in U.S. Pat. Nos. 4,159,954 to Gangemi, 4,229,306 to Hein et al., 4,404,006 to Williams et al., 4,863,598 to Drori, 5,147,545 to Despard et al., Des. 260,175 to Hein et al. and Des. 306,340 to Whiting.

Although these prior art filter devices solve a number of problems in filtering various fluids traveling through them, they are not applicable in all situations and, in particular, for filtering foreign materials from caustic or corrosive fluids while preventing leakage of any of such caustic of corrosive fluids therefrom. Therefore, there still exists the need in the art for a filter that is made from a material that is highly resistant to caustic and corrosive fluids and which utilizes a tortuous path to effectively retain a filter element within a two piece housing having effective sealing means between a filter element held therein and the two housing pieces.

The present invention describes a device for effectively filtering foreign materials from caustic or corrosive fluids, through the novel use of a housing fabricated from two portions made from a plastic resistant to such caustic or corrosive fluids, and having a filter element sealingly supported therein between tortuous path means and with novel sealing means between the two housing portions. The sealing means may take the form of an accordion type seal, or, in a one use or disposable form of the invention, a male-female type locking and sealing means may be used. The sealing means allows the filter element to be removed and examined, if needed, and allows the two portions of the housing to be easily and sealingly assembled together.

The invention disclosed herein overcomes many of the known problems in attempting to filter foreign materials from caustic or corrosive fluids used in various industries, such as the computer chip manufacturing, film developing or film manufacturing industries, by providing a filter having a filter element between two plastic housing portions and sealing the housing portions together in such a manner to support the filter element and prevent leakage therefrom. The sealing means is preferably formed integrally with at least one of the housing portions and may take the form of an accordion type seal, or may comprise integral male-female type locking and sealing means on both housing portions.

SUMMARY OF THE INVENTION

Accordingly, it is a general object of the present invention to provide an improved device for filtering caustic or corrosive fluids. It is a more particular object of the present invention to provide a disposable device, attachable to a fluid line to filter caustic or corrosive fluids. It is a still more particular object of the present invention to provide a simple, easy to use means of directly filtering a caustic or corrosive fluid in a line. A further particular object of the present invention is to provide an improved sealing means for a two part housing having a filter element supported therein for use in filtering caustic or corrosive fluids. More specifically, the present invention eliminates the possibility of fluid leakage in a pressurized fluid system of the type used in any area where caustic or corrosive fluids are used, and eliminates the need for further or separate sealing means in a filter housing, thereby increasing the efficiency and reducing the cost thereof.

In accordance with one aspect of the present invention, there is provided an improved device for filtering pressurized caustic or corrosive fluids. The device has a body comprised of two external pieces, telescoped together to form an internal chamber supporting a filter element therein.

The two pieces of the body are coupled together and include means for supporting the filter element and resilient sealing means formed thereon to prevent leakage of fluid from the body.

BRIEF DESCRIPTION OF THE DRAWINGS

The objects and features of the present invention, which are believed to be novel, are set forth in particularity in the appended claims. The present invention, both as to its organization and manner of operation, together with further objects and advantages may best be understood by reference to the following description, taken in connection with the accompanying drawings, in which:

FIG. 1 is a perspective view of an improved fluid filter of the present invention;

FIG. 2 is a cross-sectional view taken along line 2—2, of FIG. 1;

FIG. 3 is a plan view of one side of one of a pair of filter element support plates held in an internal chamber formed in the filter of FIG. 1;

FIG. 4 is an enlarged partial cross-sectional view of the end of a male housing portion showing an arrangement to allow the end thereof to collapse in an accordion-type manner to form a seal between mating housing portions;

DESCRIPTION OF THE PREFERRED EMBODIMENTS

Figure 6:
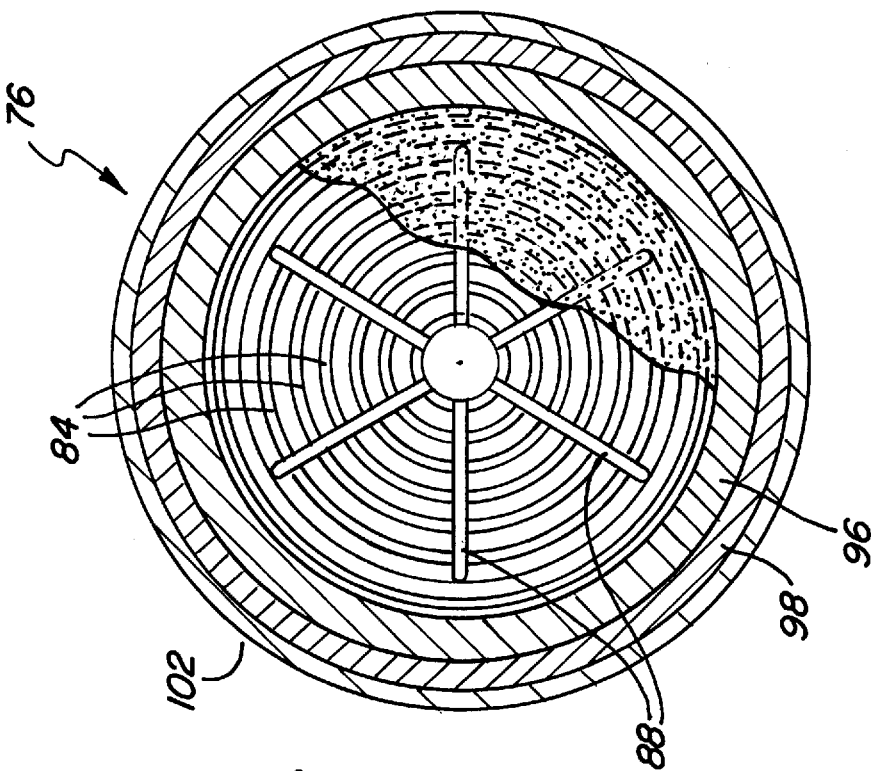
FIG. 6 is a cross-sectional view taken along line 6—6, of FIG. 5.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to describe an improved, filter device for caustic or corrosive fluids, identified generally at 10.

Turning now to the drawings, there shown in FIGS. 1–4 is a preferred embodiment of the filter device 10 having a hollow central chamber 12, formed by two (2) telescoping male and female body portions 14, 16, with a fluid inlet 18 and outlet 20 (could be reversed) connected thereto. The male and female telescoping telescoping body portions 14 and 16 are in turn preferably held together by an external sleeve 22. The external sleeve 22 is preferably secured to female housing portion 16 by securing means, such as external threads 24 formed on the exterior of the female housing portion 16 cooperating with internal threads 26 formed in the sleeve 22.

The entire filter 10, including the external sleeve 22 is preferably cylindrical, and the sleeve 22 includes an opening 28 formed centrally thereof, through which an outwardly extending cylindrical portion 30 of male housing portion 14 extends. The cylindrical portion 30 is in turn surrounded by a substantially flat exterior wall surface 34, which cooperates with an interior surface 32 of the sleeve 22 to press the male housing portion 14 into the female housing portion 16, so as to seal the housing portions and the internal chamber 12 to prevent leakage of any fluid therefrom, as explained more fully below.

The hollow interior chamber 12 has a pair of filter element support disks, holders or plates 36, 38 secured therein between interior wall portions 41, 42 of the male and female housing portions 14, 16. A flexible filter element or membrane 40 is secured between the plates 36, 38 at its periphery, as by means of one or more annular ridges, or the like 46, formed on surface 50 of plate 36, cooperating with one or more annular grooves, or the like 48, formed on surface 52 of plate 38. The sealing occurs when the two housing portions 14, 16 are urged together, which in turn presses the plates 36, 38 together so as to capture the peripheral edge of the filter element 40 therebetween. In the sealed position, the flexible filter element 40 is supported by a plurality of concentrically arranged circular wall portions 54, 56 formed on adjacent surfaces 50, 52 of the holding disks 36, 38. When fluid is fed to the filter element 40, from the inlet 18 (or 20, if reversed) it first passes through a plurality of openings 58 into spaces between the concentrically arranged circular wall portions 54. As shown in FIG. 3, there are more openings 58 toward the larger diameter outer periphery of disks 36 and 38 to allow more fluid enter the spaces and filtered by the larger outer diameter area of the filter element 40. After passing through the filter element 40, the filtered fluid enters spaces between the concentrically arranged circular wall portions 56 and exits to the outlet 20 through a further plurality of openings 60. The disk 38 preferably mirrors the disk 36, and has the same number of concentrically arranged circular wall portions, spaces and openings as the disk 36.

The entire filter 10, except for the filter element 40 may be made from any desirable material which is resistant to caustic or corrosive materials. The currently preferred material from which the housing portions 14, 16 and disks 36, 38 are made, is the plastic sold under the trademark TEFLON. The filter 10 is connected via inlet 18 and outlet 20 to lines (not shown) for feeding fluid to and from the filter, in any desired manner.

In use, the fluid filter 10 is assembled together so that the filter element 40 is secured between the two holding disks 36, 38, which are in turn clamped in hollow central chamber 12 by means of raised external annular ring portions 62, 64 formed on outer surfaces 66, 68 of the disks 36, 38, cooperating with the internal walls 41, 42, when the male and female housing portions 14, 16 are clamped together by external sleeve 22. As best shown in FIGS. 2 and 4, when the filter 10 is assembled with the housing portions 14, 16 completely clamped together, an annular wall 70 of the male housing portion 14 is completely inserted into the female housing portion 16, so that a tapered end 74 thereof is firmly pressed against surface 42. If desired, an optional gasket (not shown) may be inserted in the female housing portion 16 against surface 42, to enable the tapered end 74 to be seated against such gasket. The annular wall 70 is provided with one or more internal and external cuts or slots 72, preferably one internal and one external slot, thus allowing the wall to collapse or fold in an accordion-type manner, to provide an effective internal seal between the male and female housing portions. All of the elements of the filter 10 are machined to close tolerances so as to be properly sized and dimensioned to enable the male housing portion 14 to be sealing secured in the female housing portion 16 by the accordion seal means 72, 74, with the plates 36, 38 sealing held in the hollow chamber 12, and the filter element 40 firmly and sealingly secured between the holding plates 36, 38, in such a manner to control the flow of pressurized fluid through the various elements of the filter, without leakage.

It, therefore, can be seen that the preferred embodiment of the filter device 10 of the present invention allows foreign matter to be filtered from fluids by a filter element sealingly secured between holding plates captured between sealed together male and female housing portions. The filter of the present invention is substantially made from TEFLON to allow the foreign materials to be filtered from caustic or corrosive fluid passing therethrough. The foreign material will be captured in spaces formed between spaced apart concentric wall portions formed in the holding plates.

Figure 5:
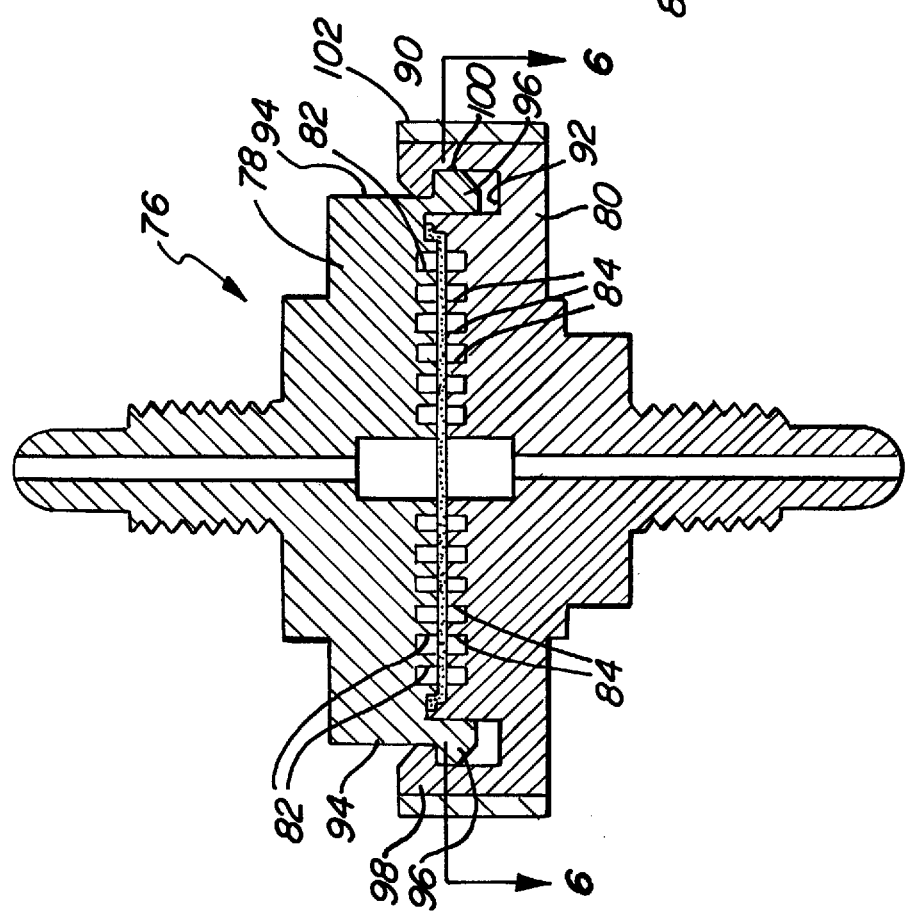
FIG. 5 is a partial cross-sectional view of a further embodiment of the filter of the present invention, in a one use or disposable version.

Further, as best shown in FIGS. 5 and 6, it should be noted that the objective of trapping the foreign materials filtered from the caustic or corrosive fluids passing through the filter may also be accomplished by use of a filter device 76 having the filter element 40 secured between two separate male and female housing portions 78, 80. The housing portions 78, 80 have, integrally formed therein, a plurality concentric annular walls 82, 84, separated by annular spaces or grooves, connected together by a plurality of slots 86, 88 on flat surfaces 90, 92. The filter element 40, is clamped at its periphery between the surfaces 90, 92 by means of one or more annular ridges, or the like, formed on surface 90, cooperating with one or more annular grooves, or the like, formed on surface 92, in the same manner as described above in connection with the separate holding plates 36, 38. When the male and female housing portions 78, 80 are inserted into each other with the filter element 40 captured between the flat surfaces 90, 92, the housing portions are sealingly clamped together by external holding and sealing means, preferably comprising interlocking ends of the housings. That is, an outer wall 94 of male housing portion 78 ends in an enlarged lip 96 having an angled end, while an outer wall 98 of female housing portion 80 has an internal enlarged annular ring or open area 100. The enlarged lip 96 is adapted to be inserted into and interlocked with the enlarged ring or open area 100 and sealingly pressed against he surface of the internal wall in the open area 100, so as to hold the male and female housing portions 78, 80 together. If the pressure in the filter device is very high, a pressure band or other type holding band 102, preferably made from metal may be secured over the outer wall 98 to press the open area 100 against an angled edge of the enlarged lip 96 to ensure a tight liquid seal.

Those skilled in the art will appreciate that the above described preferred embodiments are subject to numerous modifications and adaptations without departing from the scope and spirit of the invention. Therefore, it is to be understood that, within the scope of the appended claims, the invention may be practiced other than as specifically described herein.

What is claimed is:

1. A fluid filter device for installation in a pressurized line containing caustic or corrosive fluid comprising, in combination:

a body having a first male portion and a second female portion;

a hollow chamber formed in said body between said first male portion and said second female portion;

fluid passages formed through said first male portion and said second female portion and connected to said hollow chamber;

filter means secured between a pair of filter holding disks in said hollow chamber;

a plurality of concentric walls having spaces therebetween formed on said pair of filter holding disks and fluidly connected to said filter means;

sealing means formed between said first male portion and said second female portion to prevent leakage of fluid from said filter device; and said first male portion including an annular wall having a tapered end and a plurality of internal and external cuts formed on said annular wall to allow said annular wall to collapse when compressed in an accordion-type manner, to provide an effective internal seal between said first male portion and said second female portion.

2. The fluid filter device of claim 1 wherein said pair of filter holding disks are clamped in said hollow chamber by means of raised external annular ring portions formed on outer surfaces of said pair of filter holding disks when said first male portion and said second female portion are clamped together.

3. The fluid filter device of claim 2, further including an external sleeve for clamping said first male portion and said second female portion together.

4. The fluid filer device of claim 1 wherein, except for said filter element, said filter device is made entirely from a chemical resistant plastic.

5. A fluid filter device for installation in a pressurized line containing caustic or corrosive fluid comprising, in combination:

a body having a first male portion and a second female portion;

a hollow chamber formed in said body between said first male portion and said second female portion;

fluid passages formed through said first male portion and said second female portion and connected to said hollow chamber;

filter means secured between a pair of filter holding disks in said hollow chamber;

a plurality of concentric walls having spaces therebetween formed on flat surfaces and fluidly connected to said filter means; and the elements of said filter being sized and dimensioned to enable said first male portion to be sealingly secured in said second female portion by a compressive accordian sealing means.

6. The fluid filter device of claim 5 wherein said first male portion and said second female portion are made of chemical resistant material, and said first male portion includes an annular wall having a tapered end and a plurality of internal and external cuts which allow said annular wall to form said compressive accordion sealing means, to provide an effective internal seal between said first male portion and said second female portion.

7. The fluid filter device of claim 6 wherein said pair of filter holding disks are clamped in said hollow chamber by means of raised external annular ring portions formed on outer surfaces of said pair of filter holding disks when said first male portion and said second female portion are clamped together.

8. The fluid filter device of claim 7, further including an external sleeve for clamping said first male portion and said second female portion together.

9. A fluid filter device for installation in a pressurized line containing caustic or corrosive fluid comprising, in combination:

a body having a first male portion and a second female portion;

a hollow chamber formed in said body between said first male portion and said second female portion;

fluid passages formed through said first male portion and said second female portion, and connected to said hollow chamber;

a pair of filter holding disks having a plurality of concentric walls formed on flat surfaces thereof held in said hollow chamber;

a plurality of spaces formed in said pair of filter holding disks between said plurality of concentric walls;

a plurality of openings formed in said pair of filter holding disks and fluidly connected to said spaces;

a filter means held between flat surfaces of said pair of filter holding disks;

means for clamping said first male portion and said second female portion together;

sealing means formed between said first male portion and said second female portion to prevent leakage of fluid from said filter device; and said first male portion including an annular wall having a tapered end and a plurality of internal and external cuts formed on said annular wall to allow said annular wall to collapse when compressed, to provide an effective internal seal between said first male portion and said second female portion.

10. The fluid filter device of claim 9 wherein said pair of holding disks include raised external annular ring portions formed on outer surfaces thereof.

11. The fluid filter device of claim 10 wherein said means for clamping said first male portion and said second female portion together is an external sleeve.

12. The fluid filter device of claim 11 wherein except for said filter element, said filter device is made entirely from a chemical resistant material.

* * * * *